UNITED STATES PATENT OFFICE.

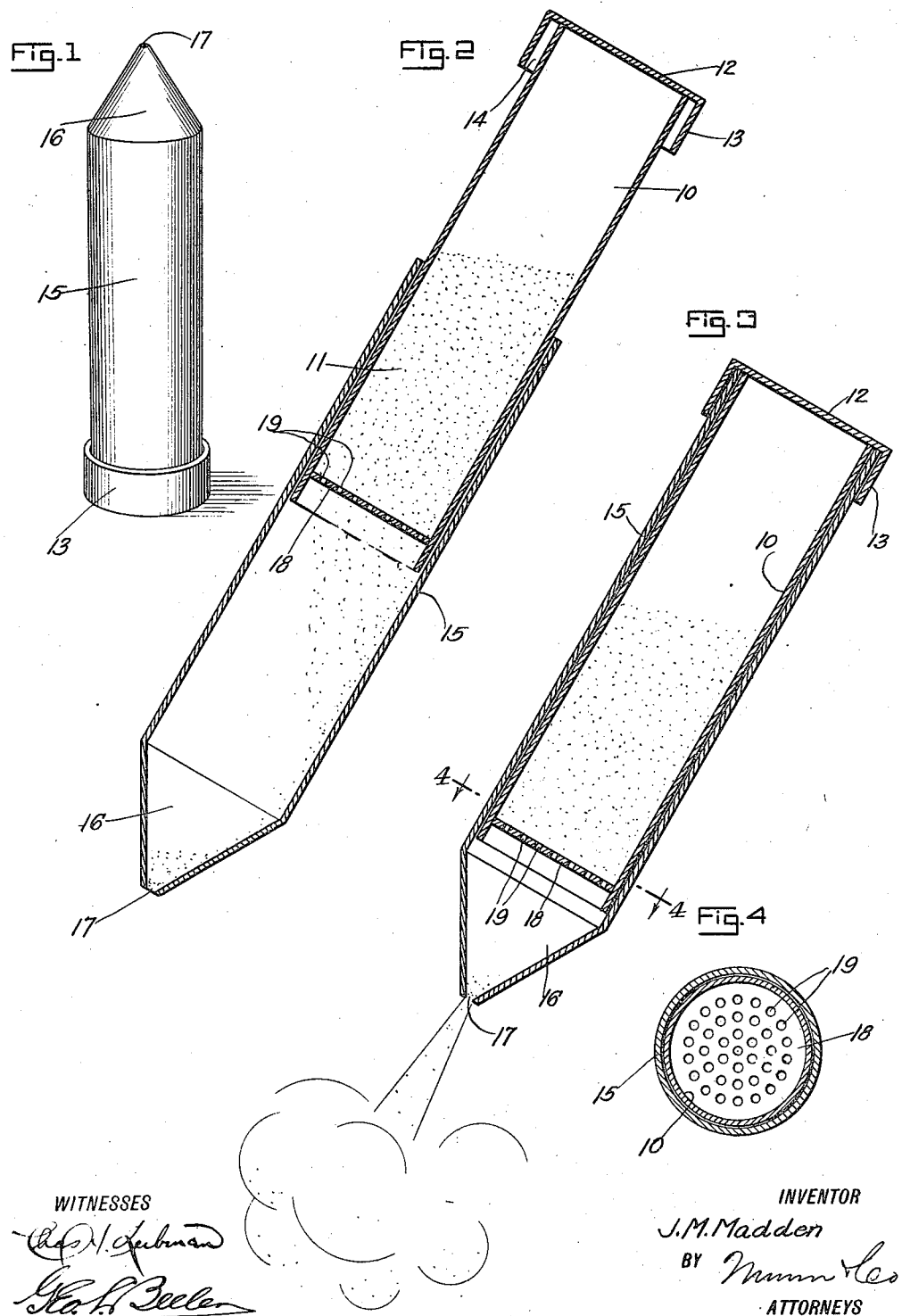

JEREMIAH M. MADDEN, OF NEW YORK, N. Y.

INSECT-DESTROYER.

1,272,283.

Specification of Letters Patent.  Patented July 9, 1918.

Application filed February 7, 1918. Serial No. 215,874.

*To all whom it may concern:*

Be it known that I, JEREMIAH M. MADDEN, a citizen of the United States, and a resident of the city of New York, borough of Manhattan, in the county and State of New York, have invented a new and Improved Insect-Destroyer, of which the following is a full, clear, and exact description.

This invention relates to insecticides and has particular reference to a dispensing container for a dry powdered insect destroyer.

Among the objects of the invention is to provide a commercial container of characteristic design or form adapted to be sold on the market filled with the commodity contained therein in suitable form to be dispensed directly from such container.

Another object of the invention is to provide a container comprising facilities for forcibly ejecting therefrom small quantities of dry dust-like or powdered material, having in view two general objects, first, to deliver the powder or commodity into the remotest crevices, cracks, or other hiding places for the insects, and, secondly, to prevent the commodity from being promiscuously distributed or delivered on or about the container or other parts of the building so as to either waste the material or occasion an unsightly appearance.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a perspective view of one of my improved containers in normal upright position.

Fig. 2 is a longitudinal sectional view showing the action of the device in its intermediate function of delivering a small quantity of the material into the outer chamber or cylinder.

Fig. 3 is a view similar to Fig. 2 but showing the forward action of the piston or powder container proper and the delivery from the outer member the small quantity of powder for its intended use; and Fig. 4 is a transverse sectional detail on the line 4—4 of Fig. 3.

Upon reference to the drawings for a complete description of the construction and its operation, 10 will be understood to indicate a container of generally hollow cylindrical form and designed to be filled with any desired powdered commodity 11 such as an insect destroyer or its equivalent. For this purpose the container 10 may be formed of any suitable relatively rigid cheap material such as straw board or the like so that when the contents thereof have been used the container may be discarded.

At the bottom is provided a disk-like closure 12 fixed to the end of the cylinder in any suitable manner preferably rigidly and immovable, the diameter of the bottom closure being greater than that of the container and provided at its periphery with a flange 13 concentric with the vertical axis of the container and spaced outwardly as indicated at 14. This flange 13 serves two purposes, first, as a hand hold for the bottom end of the container and as a housing for the lower otherwise open end of the shell of cylinder 15 that is adapted to reciprocate or telescope over the outer surface of the container.

The shell 15 for the most part, like the container, is of hollow cylindrical form, and may be made of straw board or other equivalent relatively rigid cheap material. The diameter of the shell is determined so that it will fit fairly snugly upon the outer surface of the container but over which it may be reciprocated while held with one hand, while the other hand grasps and manipulates the container at the flange 13. The upper or outer end of the shell comprises a spout-like extension 16 shown as preferably in the form of a cone and provided with a small outlet 17 at its apex. This cone portion is preferably made as an integral part of the shell or connected thereto in any other suitable manner and provides for the container as a whole, a characteristic appearance whereby this particular container may be recognized on the market.

The upper or outer end of the container 10 is provided with any suitable form of closure or cap 18 which may be provided with perforations 19 therein either during the manufacture of the device or to be formed therein by the user of the commodity by means of a suitable tool or instrument, upon the removal of the shell 15.

The use of the improvement may be briefly summarized as follows: With the container 10 provided substantially as indicated and filled with pulverulent material 11 as described and with the holes 19 formed through the cap 18 the operator grasps the hand hold 13 with one hand and the shell 15 with the other hand and then with the device inverted as in Fig. 2 and the shell reciprocated outward a small quantity of the material 11 will be sifted downward or outward through the holes 19 into the delivery end of the shell, the hole 17, however, being so small that such material will not spill therethrough by gravity. The operator then forces the container toward the cone 16, similarly to the action of a piston in a cylinder, and the air trapped within the space between the cone and the cap 18 being compressed by such action will be forcibly ejected through the hole 17 carrying with it in a stream the small quantity of dust or powder previously delivered into this space. It will be understood that for this purpose the shell has a substantially air tight fit upon the outer surface of the container. On a subsequent outward reciprocation of the shell over the container a fresh charge of air will be admitted, however, into the shell ready for a repetition of the action just described, such admission of air being largely through the hole 17, the vacuum that tends to be formed by this outward reciprocation of the shell assists, however, in the delivery of a subsequent small portion of the powder into the outer chamber. Since the material is ejected in a relatively fine stream, due to the action of the pocket of air through the small hole 17, the dust or powder will be ejected thereby forcibly into the remotest accessible crevices, cracks, openings or hiding places of any insects or the like to be destroyed. Obviously the use of this device is not to be limited to any particular place, but it may be indicated that among such uses are the destruction of flies or other winged insects, bed bugs, lice, and also for the fumigation of plants in greenhouses, gardens, or the like. It is to be noted furthermore that since the means for delivering the small quantity of insecticide provides for the delivery thereof into the remotest hiding places, there is little or no probability that any of the powder even of a colored nature will be left exposed to present an unsightly appearance.

I claim:

1. The herein described container for dispensing powder comprising an inner member for holding the bulk of the powder, and an outer shell having a sliding fit over the container and adapted to be reciprocated thereover, the container being provided with a perforated closure to hold the bulk of the material to permit a small portion thereof to enter the outer shell space and the outer shell being provided with means at its outer end to cause the small portion of powder therein to be ejected in a fine stream when the outer shell is reciprocated toward the base of the container.

2. In a dispensing device for powder, the combination of a container of uniform cross section and adapted to hold a quantity of material to be dispensed, said container being provided at its base end with a hand hold, and an outer shell fitted and slidable upon the outer surface of the container from one end to the other with a substantially air tight fit, said shell being provided at its outer end with a tapered nozzle member having a small delivery port at its apex through which any material in the space between the delivery portion and the container will be discharged in a fine stream by the compressed air trapped in such space when the shell is reciprocated toward the base of the container.

JEREMIAH M. MADDEN.